(12) United States Patent
Pisklak et al.

(10) Patent No.: US 10,717,916 B2
(45) Date of Patent: Jul. 21, 2020

(54) CEMENT ADMIXTURE INCLUDING POLYMERS

(71) Applicant: Halliburton Energy Services, Inc., Houston, TX (US)

(72) Inventors: Thomas J. Pisklak, Cypress, TX (US); Sam J. Lewis, Spring, TX (US); Peter James Boul, Houston, TX (US); Pauline Akinyi Otieno, Spring, TX (US); Kyriacos Agapiou, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/907,436

(22) PCT Filed: Sep. 4, 2013

(86) PCT No.: PCT/US2013/057946
§ 371 (c)(1),
(2) Date: Jan. 25, 2016

(87) PCT Pub. No.: WO2015/034477
PCT Pub. Date: Mar. 12, 2015

(65) Prior Publication Data
US 2016/0186036 A1    Jun. 30, 2016

(51) Int. Cl.
| | | |
|---|---|---|
| C09K 8/467 | (2006.01) | |
| C04B 24/28 | (2006.01) | |
| E21B 33/14 | (2006.01) | |
| C04B 24/26 | (2006.01) | |
| C04B 28/02 | (2006.01) | |
| C04B 103/00 | (2006.01) | |

(52) U.S. Cl.
CPC .......... *C09K 8/467* (2013.01); *C04B 24/2652* (2013.01); *C04B 24/283* (2013.01); *C04B 28/02* (2013.01); *E21B 33/14* (2013.01); *C04B 2103/0079* (2013.01)

(58) Field of Classification Search
CPC ... C09K 8/467; C04B 24/2652; C04B 24/283; C04B 2103/0079; E21B 33/14
See application file for complete search history.

(56) References Cited

U.S. PATENT DOCUMENTS

| | | |
|---|---|---|
| 5,099,922 A | 3/1992 | Ganguli |
| 6,613,720 B1 | 9/2003 | Feraud et al. |
| 8,851,173 B2 | 10/2014 | Brothers et al. |
| 2004/0262000 A1* | 12/2004 | Morgan ............ C04B 28/02 |
| | | 166/293 |
| 2012/0032107 A1 | 2/2012 | Imbabi |

FOREIGN PATENT DOCUMENTS

| | | | |
|---|---|---|---|
| WO | 2009144081 A | 12/2009 | |
| WO | 2012156148 A1 | 11/2012 | |
| WO | WO 2012/156148 A1 * | 11/2012 | ............ C04B 24/26 |

OTHER PUBLICATIONS

International Search Report and Written Opinion dated Jun. 2, 2014 for PCT Application No. PCT/US2013/057946 filed on Sep. 4, 2013 (13 pages).

\* cited by examiner

*Primary Examiner* — Robert D Harlan
(74) *Attorney, Agent, or Firm* — Chamberlain Hrdlicka

(57) ABSTRACT

Systems and methods for modifying rheology of a cement slurry are described. Systems and methods may include a composition including at least one of: one or more polycarboxylate ethers (PCEs); one or more functionalized polyacrylamide co-polymers; and one or more polysaccharide biopolymers (BP).

12 Claims, No Drawings

CEMENT ADMIXTURE INCLUDING POLYMERS

FIELD

The present disclosure relates to systems and methods for cement admixtures, and, more specifically, to systems and methods for cement admixtures with polymers.

BACKGROUND

Achieving optimal rheological behavior in cement slurries is imperative to well completion operations as well as whenever else the use of cement is called for in drilling or hardening. An effective cement system provides isolation between subterranean zones. To effectively utilize cement in a well operation, the cement slurry, upon mixing with water and necessary additives, fillers, etc., must exhibit fluid behavior that allows it to be pumped efficiently downhole without hardening, settling, or damaging equipment and be placed in the desired location where it will set into a hardened material.

Because the cement slurry is a suspension, the settling of solids is one problem often encountered with cement formulations. Settling may result in packing off in equipment lines at the surface and may result in a non-uniform cement composition when in a static position after placement downhole. Settling problems are often caused by the cement slurry having a low viscosity that cannot adequately suspend solids. To counter settling, viscosifiers or suspension aids are often mixed into slurry formulations as additives. Such additives, however, must be carefully formulated and subsequently added to the cement slurry so as not to reach a viscosity too high for working operations. In addition, such additives should not overly adversely affect the strength of the final product or inhibit the chemical reaction in a manner that cannot be controlled or predicted.

In addition to settling, another problem arises when pre-mature hydration events occur that lead to gelation of cement slurries. Gelation increases the slurry viscosity, rendering the slurry far less workable and less fit for pumping and placement. To prevent slurry gelation, cement retarders are often added to the slurry formula to suppress hydration reactions that lead to gels. Cement hydration retarders, however, impose a significant influence on set time and, therefore, must be carefully formulated. Dispersing additives may also be added to mitigate gel formation through a mechanism resulting in the repulsion of cement particles and preventing aggregation within the cement slurry. Dispersants must also be added with care to avoid over-dispersion, which can re-introduce the aforementioned issue of solids settling.

When both settling of solids and gelation occur, the slurry may become unrecoverable even by addition of powerful dispersants. Concurrent settling and gelation in a slurry gives rise to a material that cannot be used operationally, and is likely to damage equipment if trapped in deposition lines and/or pumps. There is, therefore, a need to develop the means to combat settling and gelation to obtain optimal cement slurry rheology.

DETAILED DESCRIPTION OF THE PREFERRED EMBODIMENTS

Systems and methods are described for cement slurry additives. The cement slurry additives may comprise one or more additives. In certain embodiments, the one or more additives may include polymers. The one or more additives may impart excellent workability for the slurry, including (1) mitigating settling of solids, and (2) mitigating gelation phenomena. The one or more additives may operate synergistically to improve slurry workability. The examples described herein relate to cement slurry additives for illustrative purposes only. In particular, the systems and methods may be used wherever reduction of settling and gelation phenomena is desirable. Embodiments may be utilized to provide optimal rheology for any fluid used in oil well operations, e.g., drilling fluid, spacer fluid/flush, treatment fluids, cements, settable fluids, production fluids, etc. However, the invention is particularly useful in the context of being used with cement and settable fluids because of the ability to mitigate gelation. While settling is an issue that all of the aforementioned fluids may encounter, gelation is a phenomena exhibited by cement(s) and other settable fluids due to hydraulic chemical reactions taking place. Any extended life system whether lime-pozzolan, Portland, aluminate cement, etc. may benefit from the systems and methods described herein.

Embodiments described herein may provide admixture packages to be used for, but not limited to, slurries of lime-pozzolan cement, pozzolan cement, Portland cements, gypsum cements, high alumina content cements, silica cements, high alkalinity cements and calcium phosphate cements. The admixture packages may provide improved slurry workability and may allow for enhanced pumping and downhole placement. Improved rheology may be achieved due to synergistic interactions between components of the admixture packages. The synergistic interactions may occur at appropriate relative concentrations to mitigate both settling and gelation in a cement slurry. Cement compositions as described herein can be mixed off-site and transported to the well site or mixed on-site. Due to the long fluid state of certain embodiments, the location of mixing, interventions required, such as stirring, agitating, etc., and additives needed to keep the cement composition viable may be altered from a traditional cement composition.

Certain embodiments may be directed to an Extended Life Slurry (ELS). In these embodiments, the ELS must remain in a fluid, pumpable state for a period of time from one day to several months, depending on the operational requirements, and then be set when desired through activation by suitable agents or stimuli. The storage requirements for ELSs place demands not only on the quality of the slurry rheology upon preparation, but on the ability to maintain a fluid, pumpable slurry over the desired time period. During this storage period, there is potential for settling of solids and/or gelation phenomena to occur, which can present significant problems that render the ELS unusable. To counteract these issues, one or more actions are typically used. These actions include, but are not limited to, regularly agitating or re-circulating the slurry and not allowing the ELS to remain in a static state. Additionally, and useful in the case of gelation, doses of dispersing additives can be applied to return the slurry to a desirable state. These solutions may require specialized equipment, procedures, and/or personnel to be carried out, can be costly, and can compromise quality of the slurry by subjecting it to numerous post-preparation treatments.

In certain embodiments, the admixture described herein may include one or more of the following:
  (1) a polycarboxylate ether (PCE);
  (2) a functionalized acrylamide co-polymer, such as preferably an acrylamido-methyl-propane sulfonate polymer (AMPS®)-N-functionalized acrylamide co-polymer, such as preferably a co-polymer derived from acrylamido-methyl-propane sulfonate polymer (AMPS®) and dimethylacrylamide (DMA); and/or (3) a polysaccharide biopolymer (BP).

It is through a balance in concentration of these components that the long-term slurry rheology may be maintained without undesirable levels of gelation and/or settling.

Polycarboxylate Ether (PCE)

A PCE may be in the form of a solid or a liquid solution. Examples of suitable PCEs may include, but are not limited to, LIQUIMENT 5581F (solid) available from BASF, and ETHACRYL G (40% in water) from COATEX. Activity may be as low as 1% or as high as 100%. An exemplary general structure of polycarboxylate ester containing polyether side chains is provided below:

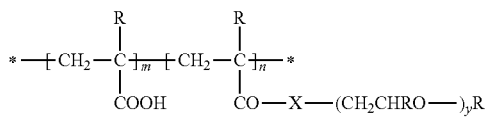

PCE has a base chemical functionality implied in its name that must be present in the (polymer) compound to be simply classified as such. One of skill in the art would be aware of PCEs compatible with the present invention. In general, superplasticizers can be used to describe a relevant class of dispersants. Alternative compounds applicable in certain embodiments may include lignosulfonates, modified lignosulfnotes, hydroxycarboxylic acids, polynaphthalene sulfonates, polymelamine sulfonates, polystyrene sulfonates, hydroxylated polysaccharides, polycarboxylate ether, ester compounds, and combinations thereof.

The terms a functionalized acrylamide co-polymer, an acrylamido-methyl-propane sulfonate polymer (AMPS®)-N-functionalized acrylamide co-polymer, a co-polymer derived from acrylamido-methyl-propane sulfonate polymer (AMPS®) and dimethylacrylamide (DMA), and AMPS®-DMA co-polymer are used interchangeably herein, but it is understood that each can be used interchangeably and/or in combination.

Functionalized Acrylamide Co-Polymer

Examples of suitable functionalized acrylamide co-polymers may include, but are not limited to, HALAD-344 available from HALLIBURTON ENERGY SERVICES.

Exemplary functionalized acrylamide co-polymers may include copolymers of N,N, dimethylacrylamide ("NNDMA") and acrylamido-methyl-propane sulfonate polymer (AMPS®). In certain embodiments, the NNDMA/AMPS® copolymer may have a mole ratio of between approximately 1:4 to approximately 4:1, and a molecular weight such that the Brookfield viscosity reading of a 1000 ppm aqueous solution of said copolymers at 5 rpm of the U.L. Adapter Spindle is in the range of between approximately 30 and approximately 250 centipoise. More preferably, the Brookfield viscosity reading is between approximately 130 and approximately 200 centipoise. Further, where such cementing compositions contain salt in an amount up to about 18% by weight of water, then a preferred mole ratio of NNDMA to AMPS® may be approximately 1:1.5.

The copolymers may be manufactured in accordance with various well known free-radical techniques. Certain solution polymerization techniques may be used to obtain polymer solutions of NNDMA and AMPS® containing 10% by weight of solids. Mole ratios of the NNDMA and AMPS® monomers are variable, but may not vary in ratio amounts greater than approximately 4 to approximately 1 in either direction.

Polysaccharide Biopolymer (BP)

A suitable polysaccharide biopolymer may include, but is not limited to, various polysaccharide biopolymer subgroups. These may include any viscosifier formulated in an optimal amount including, but not limited to, scleroglucan, carragenans, xanthan, welan, diutan gums, such as available from CP KELCO, celluloses, hydroxyl ethyl celluloses, and combinations thereof. Alternatives may include synthetic polymer viscosifiers, e.g., high molecular weight acrylamide polymers, acrylic acid-acrylamide co-polymers, and acrylamide co-polymers, and combinations thereof. This additive package may be versatile and may be used in conjunction with other additives commonly used in cement slurry formulations. This includes, but is not limited to, set accelerators, set retarders, weighting agents, fluid loss additives, and mechanical strength enhancers.

Set accelerators are well-known in the art. Several that may be suitable for embodiments disclosed herein may include, but are not limited to, calcium chloride, sodium hexametaphosphate, sodium sulfate, nanosilica, and any combination thereof. Those of ordinary skill in the art can easily obtain other accelerators that are suitable by simply testing their performance.

The invention may be used with a number of cement set retarders, and may be effective in cement slurries employing phosphonic acid derivatives. Examples of phosphonic acid derivative set retarders suitable for use with this invention may include, but are not limited to MICRO MATRIX CEMENT RETARDER available from HALLIBURTON ENERGY SERVICES, and DEQUEST 2006, DEQUEST 2066, and DEQUEST 2066A available from THERMPHOS.

Embodiments described herein may provide a multi-component admixture for cement slurries that utilizes an unexpected synergistic relationship between its main active ingredients, in optimized relative concentrations, to mitigate settling of solids and gelation. These embodiments may provide workable, pumpable cement slurries with a desired rheology. In certain embodiments, ranges may include, from low to high: PCE:AMPS®-DMA:BP at approximately 1:1:0 to 200:10:1. In certain embodiments, ranges may include, from low to high: PCE:AMPS®-DMA:BP at approximately 9:3:1 to 20:2:1, preferably 5:2:1 to 50:5:1, most preferably 8:4:1 to 40:2:1. Each of the components can vary independently throughout the range. In certain embodiments, relative quantities may be PCE>AMPS®-DMA>>BP. In certain embodiments, concentration of BP may not be greater than either of the two other components. In certain embodiments, an overall composition may have a density of approximately 6 to approximately 20 ppg, a viscosity of less than approximately 1700 cP, a yield point less than approximately 40 lb/100 ft$^2$, fluid loss of approximately 20 to approximately 500 ml/30 min as defined by API Recommended Practices 10B-2.

In certain embodiments, an admixture may include (1) a polycarboxylate ether (PCE) and (2) an AMPS®-DMA copolymer in relative quantities to provide improved suspension and mitigate formation of gels in cement slurries. It has been shown that use of either one of these components individually in cement slurries does not provide adequate suspension, prevent gelation, or both. For example, when PCE is mixed into lime-pumice cement slurry alone, over-dispersion takes place, and settling of solids and free fluid are observed within hours of preparation (Example I, Table 1). Moreover, when an AMPS®-DMA co-polymeric additive is mixed into a lime-pumice cement slurry alone, a gelled, highly viscous slurry results within 24 h of preparation (Example II, Table 1). When combined and mixed into cement slurry, however, settling of solids and gelation may not occur, and the slurry may retain a desirable rheology.

Combining both polymeric additives in a PCE:AMPS®-DMA ratio approximately ≥1, preferably from approximately 1:1 to approximately 10:1, provides, upon mixing, a slurry that does not exhibit free fluid nor gelation even for at least several days (Examples III and IV, Table 1).

TABLE 1

| Material | Example I | | | Example II | | | Example III | | | Example IV | | |
|---|---|---|---|---|---|---|---|---|---|---|---|---|
| | Amt | Unit | Mass (g) | Amt | Unit | Mass (g) | Amt | Unit | Mass (g) | Amt | Unit | Mass (g) |
| water | 60 | % bwop | 300 | 60 | % bwop | 300 | 60 | % bwop | 300 | 60 | % bwop | 300 |
| pumice | 100 | % bwop | 500 | 100 | % bwop | 500 | 100 | % bwop | 500 | 100 | % bwop | 500 |
| lime | 20 | % bwop | 100 | 20 | % bwop | 100 | 20 | % bwop | 100 | 20 | % bwop | 100 |
| retarder | 0.06 | gal/sk | 6.24 | 0.06 | gal/sk | 6.24 | 0.06 | gal/sk | 6.24 | 0.06 | gal/sk | 6.24 |
| PCE | 0.6 | % bwop | 3.0 | — | — | — | 0.3 | % bwop | 1.5 | 2.3 | % bwop | 11.5 |
| AMPS-DMA | — | — | — | 0.5 | % bwop | 2.5 | 0.3 | % bwop | 1.5 | 0.5 | % bwop | 2.5 |
| Result | Mixability 1; Settling, free fluid <12 h | | | Mixability 1; Gelation, could not be measured by viscometer; slurry unworkable <24 h | | | Mixability 5; No settling, no free fluid, no gelation for 3 d | | | Mixability 5; No settling, no free fluid, no gelation for 5 d | | |

In certain embodiments, an admixture may include (1) a PCE, (2) an AMPS®-DMA copolymer, and (3) a polysaccharide biopolymer (BP). When used in combination, such as shown below in Tables 2 and 3, this tri-component admixture may provide cement slurries that exhibit reduced or eliminated sedimentation and/or gelation for very long periods of time. This admixture may be particularly well-suited for ELS, and has been incorporated into cement slurries that have remained fluid and pumpable with desirable rheology for greater than two months.

Example V below is a slurry formulated with a PCE:AMPS®-DMA:BP ratio of approximately 40:7.5:1 (Table 2), and, after 14 days, did not exhibit sedimentation or gelation. In fact, the measured viscosity of the exemplary slurry decreased. After 80 days, this slurry was still fluid and mixable, able to be transferred by pouring with no sedimentation observed, although the measured viscosity of the slurry had increased (Table 3). Example VI is an analogous slurry containing the tri-component admixture in a PCE:AMPS®-DMA:BP ratio of approximately 70:7.5:1 (Table 2). The PCE in this example was used in the form of a 40% active aqueous solution. This mixture remained fluid and mixable with no settling for at least 14 d. Tested concentrations of components were 0.3-7% by weight of pumice PCE, 0.1-0.75% by weight of pumice AMPS®-DMA, 0.03-0.35% by weight of pumice BP. Concentrations may be dependent on relative amounts of binary or ternary system and cement composition. There may be no max or min, only balance amongst concentrations of components.

TABLE 2

| Material | Example V | | | Example VI | | |
|---|---|---|---|---|---|---|
| | Amt | Unit | Mass (g) | Amt | Unit | Mass (g) |
| water | 60 | % bwop | 3000 | 60 | % bwop | 300 |
| pumice | 100 | % bwop | 5000 | 100 | % bwop | 500 |
| lime | 20 | % bwop | 1000 | 20 | % bwop | 100 |
| retarder | 0.06 | gal/sk | 6.4 | 0.06 | gal/sk | 6.4 |
| PCE | 1.6 | % bwop | 80 | 7.0 | % bwop | 35* |
| AMPS-DMA | 0.3 | % bwop | 15 | 0.3 | % bwop | 1.5 |
| BP | 0.04 | % bwop | 2 | 0.04 | % bwop | 0.2 |
| Result | Mixability 5; No settling, no gelation, viscosity decrease at 14 d; still fluid, no settling with viscosity increase at 80 d. | | | Mixability 5; No settling, no gelation 14 d | | |

*40% activity aq. soln

TABLE 3

| Example V Rheology | | | | | | | |
|---|---|---|---|---|---|---|---|
| Age of Sample | FYSA Readings | | | | | Yield Point | Plastic Viscosity |
| (days) | 3 | 6 | 100 | 200 | 300 | (lb/100 ft$^2$) | (cP) |
| 1 | 7.5 | 9.5 | 81.5 | 157 | 237 | 3.6 | 1707 |
| 14 | 4.5 | 5.5 | 22 | 39 | 56 | 2.2 | 927 |
| 80 | 8 | 11.5 | 109 | 219 | 300+ | 2.2 | 3820 |

The exemplary cement admixtures disclosed herein may directly or indirectly affect one or more components or pieces of equipment associated with the preparation, delivery, recapture, recycling, reuse, and/or disposal of the disclosed cement admixtures. For example, the disclosed cement admixtures may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary cement admixtures. The disclosed cement admixtures may also directly or indirectly affect any transport or delivery equipment used to convey the cement admixtures to a well site or downhole such as, for example, any transport vessels, conduits, pipelines, trucks, tubulars, and/or pipes used to compositionically move the cement admixtures from one location to another, any pumps, compressors, or motors (e.g., topside or downhole) used to drive the cement admixtures into motion, any valves or related joints used to regulate the pressure or flow rate of the cement admixtures, and any sensors (i.e., pressure and temperature), gauges, and/or combinations thereof, and the like. The disclosed cement admixtures may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values.

Although the foregoing description is directed to the preferred embodiments of the disclosure, it is noted that other variations and modifications will be apparent to those skilled in the art, and may be made without departing from the spirit or scope of the disclosure. Moreover, features described in connection with one embodiment of the disclosure may be used in conjunction with other embodiments, even if not explicitly stated above.

What is claimed is:

1. A composition for modifying rheology of a cement slurry, comprising:
   one or more polycarboxylate ethers;
   one or more functionalized acrylamide co-polymers; and
   one or more polysaccharide biopolymers, wherein each of the one or more polysaccharide biopolymers is a viscosifier;
   wherein the ratio of the one or more polycarboxylate ethers to the one or more functionalized acrylamide co-polymers to the one or more polysaccharide biopolymers is between approximately 9:3:1 and approximately 20:2:1; and
   wherein the composition mitigates settling of solids and gelation in the cement slurry.

2. The composition of claim 1, further comprising the cement slurry, wherein the composition mitigates settling of solids and gelation in the cement slurry for at least 24 hours, wherein the cement slurry is an extended life cement slurry.

3. The composition of claim 1, wherein the one or more functionalized acrylamide co-polymers is an acrylamido-methyl-propane sulfonate polymer-N-functionalized acrylamide co-polymer.

4. The composition of claim 1, wherein the one or more functionalized acrylamide co-polymers is a co-polymer of acrylamide-methyl-propane and dimethylacrylamide.

5. The composition of claim 1, wherein the one or more polysaccharide biopolymers are selected from the group consisting of: scleroglucan, carrageenan, xanthan, welan, diutan gum, cellulose, hydroxyl ethyl cellulose, and combinations thereof.

6. A method of servicing a wellbore, comprising:
   combining an admixture composition and a cement slurry to produce a cement composition, wherein the admixture composition comprises:
   one or more polycarboxylate ethers;
   one or more functionalized acrylamide co-polymers; and
   one or more polysaccharide biopolymers, wherein each of the one or more polysaccharide biopolymers is a viscosifier;
   wherein the ratio of the one or more polycarboxylate ethers to the one or more functionalized acrylamide co-polymers to the one or more polysaccharide biopolymers is between approximately 9:3:1 and approximately 20:2:1; and
   wherein the admixture composition mitigates settling of solids and gelation in the cement slurry; and
   placing the cement composition in the wellbore.

7. The method of claim 6, further comprising allowing the cement composition to set in the wellbore.

8. The method of claim 6, wherein the one or more functionalized acrylamide co-polymers is an acrylamido-methyl-propane sulfonate polymer-N-functionalized acrylamide co-polymer.

9. The method of claim 6, wherein the one or more functionalized acrylamide co-polymers is a co-polymer of acrylamide-methyl-propane and dimethylacrylamide.

10. The method of claim 6, wherein the ratio of the one or more polycarboxylate ethers to the one or more functionalized acrylamide co-polymers is greater than or equal to 1.

11. The method of claim 6, wherein the one or more polysaccharide biopolymers are selected from the group consisting of: scleroglucan, carrageenan, xanthan, welan, diutan gum, cellulose, hydroxyl ethyl cellulose, and combinations thereof.

12. The method of claim 6, wherein the admixture composition mitigates settling of solids and gelation in the cement slurry for at least 24 hours, wherein the cement slurry is an extended life cement slurry.

* * * * *